United States Patent Office 3,830,778
Patented Aug. 20, 1974

3,830,778
POLYESTER COMPOSITIONS CONTAINING DI-
HYDROXYSPIROCHROMAN COMPOUNDS
Atsuaki Arai and Nobuo Tsuji, Minami Ashigara-machi,
and Toshimitsu Okutsu, Odawara, Japan, assignors to
Fuji Photo Film Co., Ltd., Minami Ashigara-shi,
Kanagawa, Japan
No Drawing. Original application Dec. 29, 1971, Ser.
No. 213, 540, now Patent No. 3,764,337. Divided and
this application Dec. 29, 1972, Ser. No. 319,128
Claims priority, application Japan, May 20, 1971,
46/34,621
Int. Cl. C08f 45/58
U.S. Cl. 260—45.8 A  13 Claims

ABSTRACT OF THE DISCLOSURE

Polyester compositions which are composed of polyesters produced from terephthalic acid as the main acid component and ethylene glycol as the main glycol component and a compound represented by the formula I

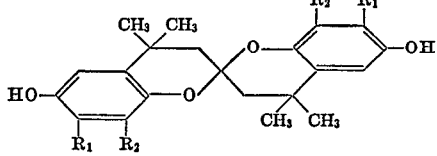

(I)

wherein $R_1$ is an alkyl group having 18 or less carbon atoms, an alkenyl group, an aryl group, an alkoxy group, an alkenoxy group, an aryloxy group, an acylaminoalkyl group or an acylaminoaralkyl group, and $R_2$ is a hydrogen atom, a halogen atom, an alkyl group, an alkenyl group or an alkoxy group.

CROSS REFERENCE TO RELATION APPLICATIONS

This application is a divisional application of copending application Ser. No. 213,540, filed Dec. 29, 1971 now Pat. No. 3,764,337.

BACKGROUND OF THE INVENTION

1. Field of the Invention

The present invention relates to polyester compositions containing dihydroxyspirochroman compounds having improved heat stability, particularly, to polyester compositions having an excellent heat resisting property which are suitable as fibers, films and tapes.

The term "polyester" used in the present invention means those obtained by reacting polybasic carboxylic acids, especially dibasic carboxylic acids, with polyhydric alcohols, especially dihydric alcohols. Though these polyesters have various excellent properties and are used in many kinds of use, they are subject to deterioration by the action of heat or ultraviolet rays, etc., which causes a lowering of the degree of polymerization, coloring and decreases mechanical strength. Particularly, coloring and decrease of mechanical strength of the fibers, films and tapes by thermal deterioration cause a considerable decrease of the commercial value thereof.

2. Description of the Prior Art

Hitherto, many kinds of phosphorus compounds, aromatic amino compounds and phenols have been suggested in order to prevent such deterioration of polyesters. However, although the phosphorus compounds are effective for preventing coloring caused by decomposition due to heat, namely breaking of polymer chains, decomposition itself could not be prevented. On the other hand, aromatic amino compounds sometimes decompose by heat to cause coloring. Further, phenols have the fault that they cause cloudiness of the polyesters because many of them have poor compatibility with polyesters.

Accordingly, an object of the present invention is to provide a stabilizing agent for polyesters in which the deficiencies of the known stabilizing agents are overcome.

Another object of the present invention is to provide polyester compositions which are stable to heat.

As the result of many studies about a process for improving the stability to heat of the polyesters, the present inventors have found that the dihydroxyspirochroman compounds represented by the formula (I)

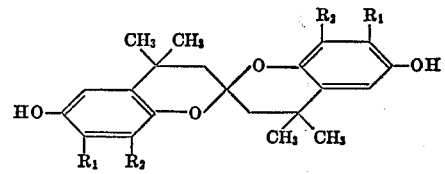

wherein $R_1$ is an alkyl group, an alkenyl group, an aryl group, an alkoxy group, an alkenoxy group, an aryloxy group, an acylamino group or an acylamino aralkyl group, each of which having 1 to 18 carbon atoms, and $R_2$ is a hydrogen atom, a halogen atom, an alkyl group, an alkenyl group or an alkoxy group, are effective for improving the heat resistance of the polyesters.

As the specific examples thereof, the following can be mentioned.

Compound I

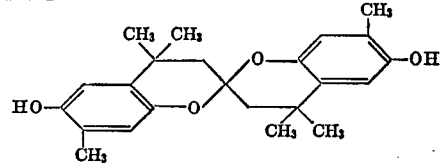

6,6' - dihydroxy - 7,7' - dimethyl-4,4,4',4'-tetramethyl-bis-2,2'-spirochroman.

Compound II

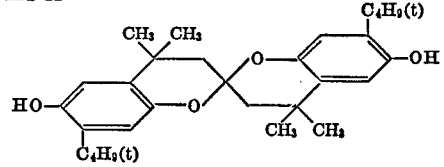

6,6'-dihydroxy - 7,7' - di-t-butyl-4,4,4',4'-tetramethyl-bis-2,2'-spirochroman.

Compound III

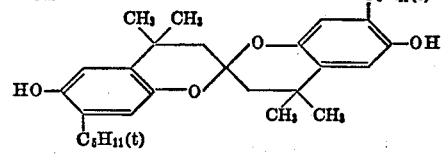

6,6'-dihydroxy - 7,7' - di-t-amyl-4,4,4',4'-tetramethyl-bis-2,2'-spirochroman.

Compound IV

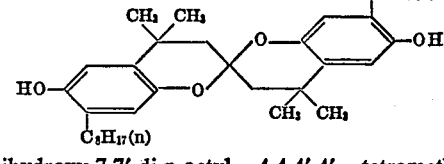

6,6'-dihydroxy-7,7'-di-n-octyl - 4,4,4',4' - tetramethyl-bis-2,2'-spirochroman.

Compound V

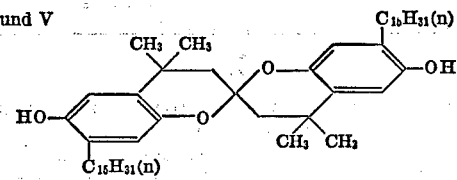

6,6'-dihydroxy-7,7'-di-n-pentadecyl-4,4,4',4'-tetramethyl-bis-2,2'-spirochroman.

Compound VI

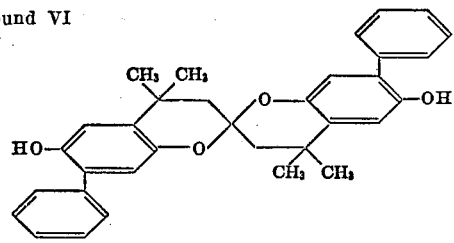

6,6'-dihydroxy-7,7'-diphenyl-4,4,4',4'-tetramethyl-bis-2,2'-spirochroman.

Compound VII

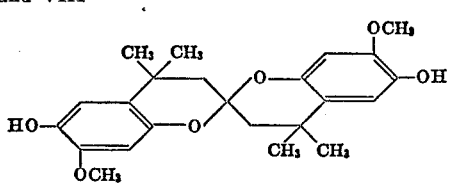

6,6'-dihydroxy-7,7'-diallyl-4,4,4',4'-tetramethyl-bis-2,2'-spirochroman.

Compound VIII

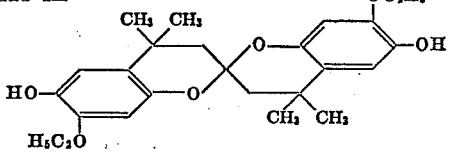

6,6'-dihydroxy-7,7'-dimethoxy-4,4,4',4'-tetramethyl-bis-2,2'-spirochroman.

Compound IX

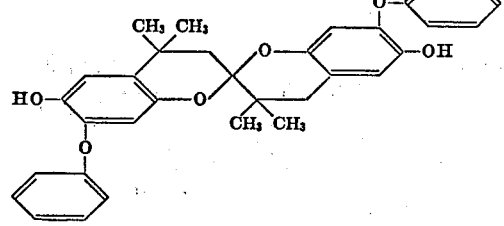

6,6'-dihydroxy-7,7'-diethoxy-4,4,4',4'-tetramethyl-bis-2,2'-spirochroman.

Compound X

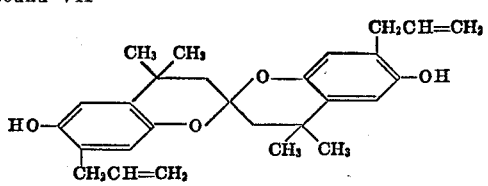

6,6'-dihydroxy-7,7'-diphenoxy-4,4,4',4'-tetramethyl-bis-2,2'-spirochroman.

Compound XI

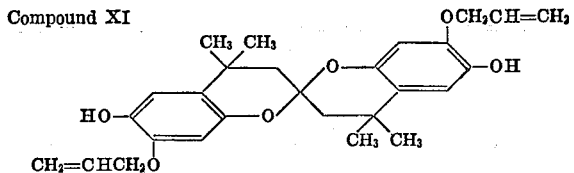

6,6'-dihydroxy-7,7'-diallyloxy-4,4,4',4'-tetramethyl-bis-2,2'-spirochroman.

Compound XII

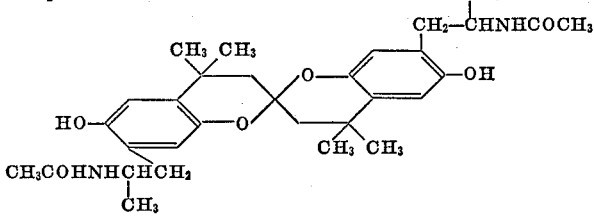

6,6'-dihydroxy-7,7'-di-β-acetylaminopropyl-4,4,4',4'-tetramethyl-bis-2,2'-spirochroman.

Compound XIII

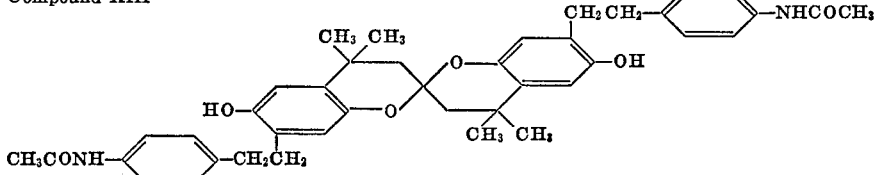

6,6'-dihydroxy-7,7'-di-β-(p-acetylaminophenyl)ethyl-4,4,4',4'-tetramethyl-bis-2,2'-spirochroman.

Compound XIV

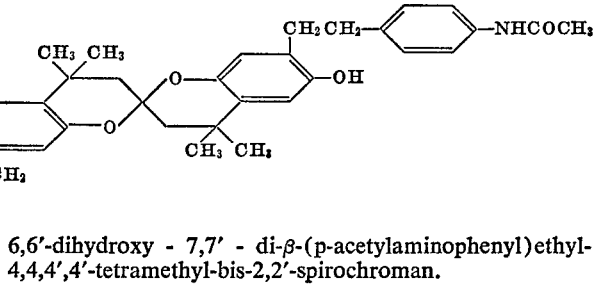

6,6'-dihydroxy-4,4',4',7,7',8,8'-octamethyl-bis-2,2'-spirochroman.

Compound XV

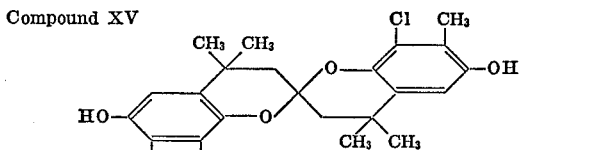

8,8'-dichloro-6,6'-dihydroxy-4,4,4',4',7,7'-hexamethyl-2,2'-spirochroman.

Compound XVI

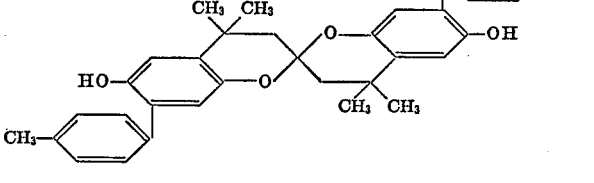

6,6'-dihydroxy-7,7'-di-p-tolyl-4,4,4',4'-tetramethyl-bis-2,2'-spirochroman.

The above-mentioned dihydroxyspirochromans are prepared by the condensation of hydroquinone derivatives with acetone.

EXAMPLE OF SYNTHESIS 1

6,6'-dihydroxy-7,7'-dimethyl-4,4,4',4'-tetramethyl-bis-2,2'-spirochromane

A 5-liter three-necked flask provided with a stirrer and a reflux condenser was charged with 620 g. (5.0 mols) of methyl hydroquinone, 1500 cc. of glacial acetic acid, 580 g. (10.0 mols) of acetone, and 850 cc. of concentrated hydrochloric acid sequentially. The resulting mixture was heated under reflux in an oil bath under stirring. In 30 minutes, the reaction mixture turned black brown. The mixture was then continuously refluxed for 7 to 8 hours, and then allowed to stand at room temperature. After a lapse of 5 days, the precipitated crystals were separated by filtration, washed with water, and recrystallized from ethanol to form 170 g. of a compound I in the form of colorless needle-like crystals. These crystals contained 1 mol of ethanol as crystal solvent. The crystals melted at 145–149° C. to release ethanol, again solidify, and then melted at 203 to 206° C. When the crystals were recrystallized from hydrous ethanol, there was obtained a compound I having a melting point of 203 to 206° C. free from crystal solvent.

*Elemental Analysis:*
Found: C, 74.85; H, 7.59%
Calculated: C, 75.00; H, 7.61%

The nuclear magnetic resonance spectrum of this compound was measured in heavy-hydrogenated acetone using TMS as an internal standard and the observed chemical shift and area intensity of the signal support the above structure.

1.28, 1.54 p.p.m. (6H; of 4,4' gem. dimethyl groups, two equivalent methyl groups)
2.08 p.p.m. (10H; methyl group at the 7,7'-position, and methylene groups at the 3,3'-position);
6.31 p.p.m. (2H; hydrogen at 5,5'-position);
7.39 p.p.m. (2H; hydroxyl group at 6,6'-position).

The mass spectrum of the compound I as measured by the direct introduction method (120° C., 70 ev., 200 μa., IM 4 kv.). Specifically, the parent ion peak (M+) 368 ($C_{23}H_{28}O_4$=368) was observed. The fragment ion peaks at m/e 353 (M+—$CH_3$), m/e 204, m/e 189 (m/e 204–$CH_3$) and m/e 165 (m/e 353–m/e 189+H) were observed.

EXAMPLE OF SYNTHESIS 2

A mixture consisting of 60 g. (0.3 mol) of 2-p-tolylhydroquinone, 200 cc. of glacial acetic acid, 53 g. (0.9 mol) of acetone and 85 cc. of concentrated hydrochloric acid was refluxed for 10 hours, and cooled to room temperature, and then allowed to stand at room temperature for 12 hours. The mixture was then slowly poured into a great quantity of ice water to form a grey-white solid. The solid was fractionated, washed with cold water, dried, dissolved in ethanol, treated with activated carbon, and then allowed to stand to give light yellow crystals. When the crystals were recrystallized from ethanol, compound XVI having a melting point of 293 to 296° C. in the form of fine crystalline powders was obtained in a yield of 14 g.

*Elemental Analysis:*
Found: C, 80.63; H, 7.00%
Calculated: C, 80.75; H, 6.92%

The mass spectrum of this compound was measured by the direct introduction method (130° C., 70 ev., 200 μa., IM 4 kv.). The parent ion peak (M+) 520 ($C_{35}H_{36}O_4$=520) was observed. Also, the fragment ion peaks at m/e 505 (M+—$CH_3$), m/e 280, m/e 265 m/e 280–$CH_3$), and m/e 241 (m/e 505–m/e 265+H) were observed.

Other spirochromans are prepared by the same way.

| Compound: | Hydroquinone Derivatives to be Used in Synthesis |
|---|---|
| II | Butylhydroxyquinone. |
| III | t-Amylhydroxyquinone. |
| IV | n-Octylhydroxyquinone. |
| V | n-Pentadecylhydroxyquinone. |
| VI | Phenylhydroxyquinone. |
| VII | Allylhydroxyqinone. |
| VIII | Methoxyhydroxyquinone. |
| IX | Ethoxyhydroxyquinone. |
| X | Phenoxyhydroxyquinone. |
| XI | Aryloxyhydroxyquinone. |
| XII | β-Acetylaminopropyl hydroxyquinone. |
| XIII | β-(Acetylaminophenyl)ethyl hydroxyquinone. |
| XIV | 2,3-dimethyl hydroxyquinone. |
| XV | 2-methyl-3-chloro hydroxyquinone. |

Compounds I–XV exemplified as examples of the above-mentioned dihydroxyspirochroman compounds are all very preferable as the heat stabilizing agent for the polyesters.

The polyesters in the present invention are represented by polyethylene terephthalate obtained by polycondensating terephthalic acid with ethylene glycol, dimethyl terephthalate with ethylene glycol, terephthalic acid with ethylene oxide, or bis-β-hydroxyethyl terephthalate which is produced by a known method. However, the polyesters include those in which terephthalic acid is the main acid component and ethylene glycol is the main glycol component. Accordingly, a part of the acid component may be substituted by one or more dicarboxylic acids such as isophthalic acid, sebacic acid and adipic acid and ester derivatives thereof, and a part of the glycol component may be substituted by one or more difunctional alcohols such as trimethylene glycol, hexamethylene glycol and polyethylene glycol etc. The ratios of the acid component and the glycol component excepting terepthalic acid and ethylene glycol, are each less than 40%.

If the amount of the dihydroxyspirochroman compounds of the present invention is too small, a sufficient effect is not obtainable, while if the amount is too large, yellowing of the polyesters is sometimes caused. Accordingly, the amount to be added is 0.005–1% by weight, and preferably 0.01–0.2% by weight, based on the acid component. These compounds may be used solely, or two or more thereof may be used together.

As the method for adding the compounds of the present invention to the polyesters, there may be employed methods for adding them to the raw materials prior to synthesizing the polyesters, a method for adding them after the conclusion of an ester interchange reaction and a method for adding them to pellets of the produced polyesters. Though the heat resisting property of the polyesters is improved by any method, addition at a polycondensation stage after the ester interchange reaction is generally most preferable, because the compounds of the invention do not diminish by volatilization, and they are dispersed and mixed homogeneously in the polyesters.

The polyester compositions of the present invention may contain catalysts such as calcium acetate, cobalt chloride, zinc chloride, magnesium oxide and antimony oxide, stabilizers such as phosphoric acid, phosphorous acid and esters thereof, frosting agents such as titanium oxide, pigments such as carbon black etc., coloring agents such as dyes, and known additives such as a branching agent, terminal stopping agent, ultraviolet absorbing agent, an antistatic agent etc.

The dihydroxyspirochroman compounds of the present invention are resistant to heat themselves. The polyesters containing these compounds have an excellent heat resisting property and retain high transparency. Therefore, they are especially suitable for producing films and tapes.

The heat resisting property of the polyesters is not injured by use together with many known additives.

In the following, the present invention will be explained specifically on the basis of examples. In the examples and comparison examples, all parts are by weight, [η] represents the limiting viscosity of the polyester, which is the value determined at 30.0° C. in a mixture of phenol and tetrachloroethane (60/40) as the solvent.

Example 1

A mixture consisting of 100 parts of dimethylterephthalate, 80 parts of ethylene glycol, 0.15 parts of calcium acetate and 0.03 parts of antimony trioxide was heated at 150–220° C. for approximately 3 hours to remove a stoichiometric amount of methanol. Then, 0.1 parts of 6,6' - dihydroxy - 7,7' - di-tert-butyl-4,4,4',4'-tetramethyl-bis-2,2'-spirochroman were added. The mixture was subjected to polycondensation at 270–280° C. for 2 hours under 1 mm. Hg pressure. The resulting polyester was colorless and transparent [η] was 0.650.

After treating this polyester by heating at 300° C. for 1 hour in nitrogen, the viscosity was determined. [η] was 0.590 and the ratio of decrease of the limiting viscosity was 9.2%.

Comparison Example 1

A polyester was produced by the same procedure as in Example 1 but there was not used the spirochroman compound of the present invention. This polyester was colorless and transparent. [η] was 0.650. When this polyester was subjected to heating by the same procedure as in Example 1, [η] was 0.515 and the ratio of decrease of the limiting viscosity was 20.7%.

Example 2

After carrying out an ester interchange reaction using the same raw materials and by the same reaction conditions as in Example 1, polycondensation was carried out by the same procedure as in Example 1 by adding 0.1 parts of 6,6'-dihydroxy-4,4,4',4'-7,7'-hexamethyl-bis-2,2'-spirochroman and 0.03 parts of phosphorus acid. The resulting polyester was colorless and transparent. [η] was 0.645. [η] after carrying out the same heat treatment as in Example 1 was 0.560. The ratio of decrease was 13.2%.

Comparison Example 2

A polyester was produced by the same procedure as in Example 2 but there was not used the spirochroman compound of the present invention. This polyester was colorless and transparent. [η] was 0.658. [η] after heat treatment was 0.520. The ratio of decrease was 21.0%.

Example 3

A polyester was produced by the same procedure as in Example 1 but there was used 6,6'-dihydroxy-7,7'-di-n-octyl-4,4,4',4'-tetramethyl-bis-2,2' - spirochroman instead of the spirochroman compound in Example 1. [η] was 0.650. [η] after heat treatment was 0.594. The ratio of decrease was 8.6%.

Example 4

A polyester was produced by the same procedure as in Example 2 but there was used 6,6'-dihydroxy-7,7'-diphenyl-4,4,4'-4'-tetramethyl-bis-2,2'-spirochroman instead of the spirochroman compound in Example 2. [η] was 0.640. [η] after heat treatment was 0.570. The ratio of decrease was 10.9%.

Example 5

A mixture consisting of 100 parts of dimethylterephthalate, 50 parts of ethyleneglycol, 90 parts of triethyleneglycol, 0.15 parts of calcium acetate and 0.03 parts of antimony trioxide was subjected to an ester interchange reaction. After adding 0.05 parts of phosphorus acid and 0.1 parts of 6,6'-dihydroxy-7,7'-n-octyl-4,4,4',4'-tetramethyl-bis-2,2'-spirochroman, polycondensation was carried out by the same procedure as in Example 1. The resulting polyester was colorless and transparent in which [η] was 0.451. [η] after carrying out heat treatment by the same method as in Example 1 was 0.370. The ratio of decrease of the limiting viscosity was 17.9%.

In a comparison, [η] of a polyester synthesized without adding the spirochroman compound was 0.445. [η] after heat treatment was 0.333. The ratio of decrease was 25.1%.

As is clear from the above examples and comparison examples, in the polyesters containing dihydroxyspirochroman compounds of the present invention, lowering of the molecular weight due to heat is little and stability is improved remarkably. Accordingly, they are particularly preferable as the fibers, films and tapes.

What is claimed is:

1. A polyester composition comprising polyethylene terephthalate having a terephthalic acid component and an ethylene glycol component therein and including in a stabilizing amount a compound represented by the formula (I)

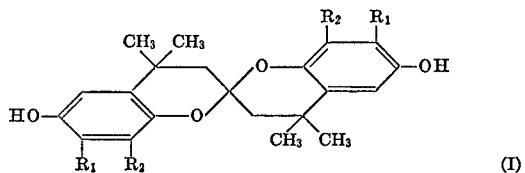

(I)

wherein $R_1$ is an alkyl group having 18 or less carbon atoms, an alkenyl group, an aryl group, an alkoxy group, an alkenoxy group, an aryloxy group, an acylaminoalkyl group or an acylaminoaralkyl group, and $R_2$ is a hydrogen atom, a halogen atom, an alkyl group, an alkenyl group or an alkoxy group.

2. The polyester composition of claim 1 wherein the compound represented by the formula (I) is selected from the group consisting of 6,6'-dihydroxy-7,7'-dimethyl-4,4,4',4'-tetramethyl-bis - 2,2' - spirochroman, 6,6'-dihydroxy - 7,7' - di-t-butyl - 4,4,4',4' - tetramethyl-bis - 2,2'-spirochroman, 6,6'-dihydroxy - 7,7' - di-t-amyl-4,4,4',4'-tetramethyl-bis - 2,2' - spirochroman, 6,6' - di-hydroxy-7,7'-di-n-octyl - 4,4,4',4' - tetramethyl-bis - 2,2' - spirochroman, 6,6'-dihydroxy - 7,7' - di-n-pentadecyl - 4,4,4',4'-tetramethyl-bis - 2,2' - spirochroman, 6,6'-dihydroxy-7,7'-diphenyl - 4,4,4',4' - tetramethyl-bis - 2,2' - spirochroman, 6,6' - dihydroxy - 7,7' - diallyl - 4,4,4',4' - tetramethyl-bis-2,2' - spirochroman, 6,6'-dihydroxy - 7,7' - dimethoxy-4,4,4',4'-tetramethyl-bis - 2,2' - spirochroman, 6,6'-dihydroxy - 7,7' - diethoxy - 4,4,4',4' - tetramethyl-bis-2,2'-spirochroman, 6,6'-dihydroxy - 7,7' - diphenoxy-4,4,4',4'-tetramethyl-bis - 2,2' - spirochroman, 6,6'-dihydroxy-7,7'-diallyloxy - 4,4,4',4' - tetramethyl-bis-2,2'-spirochroman, 6,6'-dihydroxy - 7,7' - di-β-acetylaminopropyl - 4,4,4',4'-tetramethyl-bis - 2,2' - spirochroman, 6,6'-dihydroxy-7,7'-di-β-(p-acetylaminophenyl)ethyl - 4,4,4',4' - tetramethyl-bis - 2,2' - spirochroman, 6,6'-dihydroxy - 4,4,4',4',7,7', 8,8'-octamethyl-bis - 2,2' - spirochroman, and 6,6'-dihydroxy - 7,7' - di-p-tolyl - 4,4,4',4' - tetramethyl-bis-2,2'-spirochroman.

3. The polyester composition of claim 1 wherein the compound represented by the formula (I) is 6,6'-dihydroxy-4,4,4',4',7,7'-hexamethyl-bis-2,2'-spirochroman.

4. The polyester composition of claim 1 wherein a phosphoric acid type stabilizing agent selected from the group consisting of phosphorous acid, phosphoric acid and esters thereof is further included.

5. The polyester composition of claim 1 wherein a minor amount of a polyester-forming acid other than terephthalic acid is present in addition to said terephthalic acid component and ethylene glycol component.

6. The polyester composition of claim 5 wherein said terephthalic acid component is more than 60 mol percent and said ethylene glycol component is more than 60 mol percent of the polyethylene terephthalate.

7. The polyester composition of claim 5 wherein said polyester-forming acid is at least one member selected from the group consisting of isophthalic acid, sebacic acid, adipic acid and an ester derivative thereof.

8. The polyester composition of claim 12 wherein said polyester-forming glycol is at least one member selected from the group consisting of trimethylene glycol, hexamethylene glycol and polyethylene glycol.

9. The polyester composition of claim 1 wherein said stabilizing amount of the compound represented by the formula (I) is 0.005–1% by weight based on the total acid component of said polyethylene terephthalate.

10. The polyester composition of claim 9 wherein said stabilizing amount of the compound represented by the formula (I) is 0.01–0.2%.

11. The polyester composition of claim 1 wherein a minor amount of a polyester-forming glycol other than ethylene glycol is present in addition to said terephthalic acid component and ethylene glycol component.

12. The polyester composition of claim 11 wherein said terephthalic acid component is more than 60 mol percent and said ethylene glycol component is more than 60 mol percent of the polyethylene terephthalate.

13. A process of producing a stabilized polyethylene terephthalate which comprises forming said polyethylene terephthalate in the presence of a stabilizing amount of a compound represented by the formula (I)

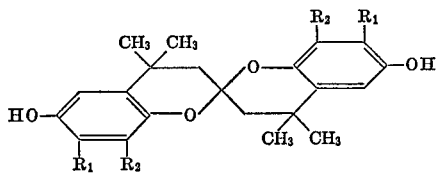

wherein $R_1$ is an alkyl group having 18 or less carbon atoms, an alkenyl group, an aryl group, an alkoxy group, an alkenoxy group, an aryloxy group, an acylaminoalkyl group or an acylaminoaralkyl group, and $R_2$ is a hydrogen atom, a halogen atom, an alkyl group, an alkenyl group or an alkoxy group.

References Cited

UNITED STATES PATENTS

| | | | |
|---|---|---|---|
| 3,361,846 | 1/1968 | Gleim et al. | 260—860 |
| 2,746,871 | 5/1956 | Thompson | 260—45.8 A |

MELVYN I. MARQUIS, Primary Examiner

U.S. Cl. X.R.

260—45.7 P, 47 C, 75 R